United States Patent [19]
Hepp et al.

[11] 3,836,212
[45] Sept. 17, 1974

[54] SUSPENSION OF SUPPORTING BODIES FOR SPIRAL GROOVE BEARINGS

[75] Inventors: Wolfgang Hepp, Immenstaad; Klaus Pimiskern, Friedrichshafen; Werner Herbert, Markdorf, all of Germany

[73] Assignee: Dornier System GmbH, Friedrichshafen, Germany

[22] Filed: June 25, 1973

[21] Appl. No.: 373,261

[30] Foreign Application Priority Data
Aug. 11, 1972 Germany............................ 2239623

[52] U.S. Cl. ............................................. 308/15
[51] Int. Cl. .......................................... F16c 13/06
[58] Field of Search ........ 308/159, 15, 22; 267/160; 248/160, 204

[56] References Cited
UNITED STATES PATENTS
2,987,638  6/1961  Lux...................................... 308/159

*Primary Examiner*—Charles J. Myhre
*Assistant Examiner*—Frank Susko
*Attorney, Agent, or Firm*—James E. Bryan, Esquire

[57] ABSTRACT

This invention relates to an improvement in an elastic centering suspension of supporting bodies for spiral groove bearings, the improvement comprising a circular membrane having apertures therein and secured to a retaining ring by electron beam welding, whereby the membrane is secured to said ring without deformation.

2 Claims, 1 Drawing Figure

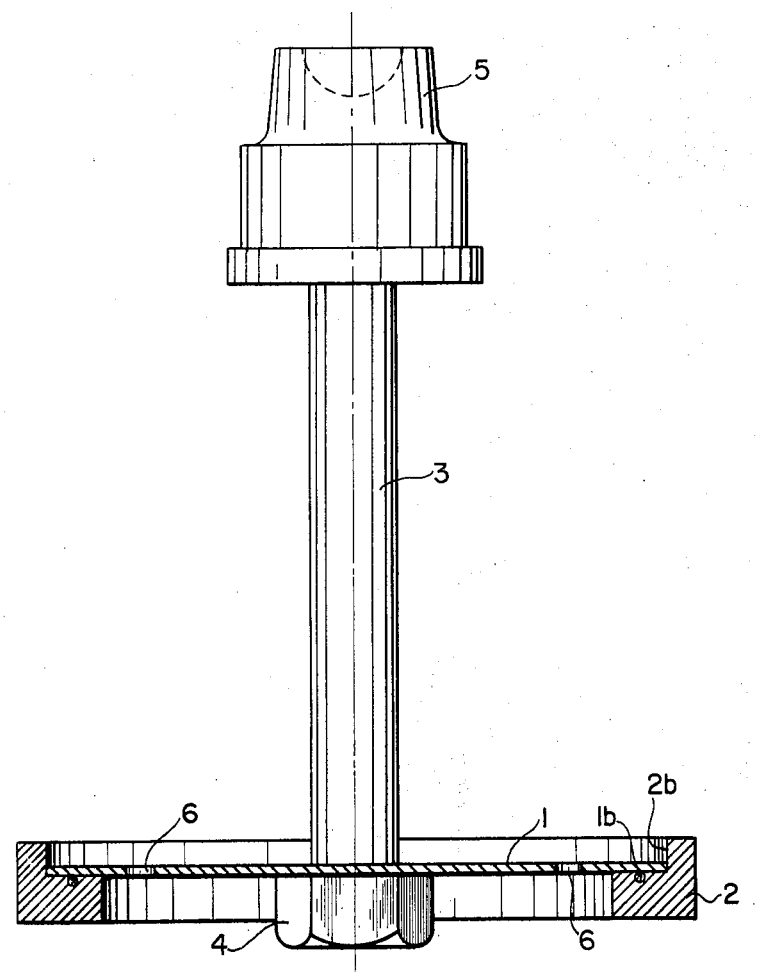

SUSPENSION OF SUPPORTING BODIES FOR SPIRAL GROOVE BEARINGS

The present invention relates to an elastic suspension of supporting bodies for spiral groove bearings upon which a shaft having a spherical or conical shaft end is supported, this supporting body being elastically centered.

For high-speed devices, for example rotors or gyroscopes, in which hemispherically or conically-shaped spiral groove bearings are employed, an elastically-centered suspension of the stationary bearing box is necessary in order to elastically absorb the natural gyroscopic oscillations of the rotors during operation. With a rigid positioning of the rotors, the forces resulting from the aforementioned oscillations would increase in such a manner that a destruction of the rotors would be produced.

In order to render it possible to dampen the aforementioned forms of oscillations, the prior art devices provide for this purpose that the non-rotating supporting body—viewed in the direction of the axis of rotation—is radially and axially movably-positioned. Such suspensions which are movable in the axial and radial directions are so disposed that a supporting body is connected by way of a pin, which is resistant to bending, to the center of a membrane or diaphragm which latter is clamped at the outside periphery thereof to the bearing housing by means of two holding or retaining rings. Determinative for an exact elastic centering of the supporting body is the uniformity of properties of the membrane, which are composed of the material, the material thickness, and the surface accuracy thereof. In the known type of elastic centering of the supporting body by deforming the membrane via two retaining rings, asymmetrical stress ratios are produced in the membrane which may cause an uneven rigidity thereof. Because of this asymmetry, the deflections of the supporting body become irregular—at the same eccentric stress during one revolution of the rotor—and lead to one-sided stresses of the rotors and bearing gliding planes or surfaces, which in turn and furthermore have the effect or result of an upswinging of the movable bearing parts and rotors, as well as an increased stress on these structural components.

It is the object of the present invention to provide for a membrane bearing support by means and with the aid of which the above-mentioned disadvantages of the prior art membrane positioning or bearing support are to be effectively eliminated while an improvement of the smoothness of operation and of the service life of the spiral groove bearings and rotors is to be achieved therewith.

This object is obtained, in accordance with the present invention, by virtue of the fact that a circular membrane which includes passage bores is connected with a retaining ring by means of electron beam welding.

By virtue of the connection of the membrane to the retaining ring by means of electron beam welding, a low-stress attachment of the membrane will be produced. The elasticity of the membrane becomes therewith very homogeneous and increases the operational smoothness and quietness as well as the useful service life of the rotors and of the spiral groove bearings. Moreover, the passage bores in the membrane influence the radial and axial rigidity of the elastic bearing support or mounting so that an adjustment of the membrane rigidity to the generated stresses is readily possible. It has been found advantageous to position the bores in a circular fashion at the same distance from the center of the membrane.

One embodiment of the elastic positioning or suspension of the supporting body has been illustrated in the accompanying drawing. The single FIGURE thereof illustrates a membrane 1, a retaining ring 2, a pin 3 which is resistant to bending and is secured centrally to the membrane 1 with the aid of a fastening screw 4, and a supporting body 5 mounted at the end of the bending-resistant pin 3.

In the embodiment shown, the membrane 1 is connected at low stress near the outside periphery thereof at 1b to the retaining ring 2 by means of electron beam welding. This type of attachment assures a uniform rigidity over the circumference of the membrane, which has a favorable effect upon the operational quietness and smoothness as well as the useful life of the spiral groove bearings and rotors. The radial deflections of the supporting body 5 are the same in every direction with the same rotating stress or load. A damper device (not shown in the drawing) prevents a further upswing of the movable bearing parts. For the purpose of centering the membrane 1 prior to the welding operation, the retaining ring 2 has an indentation or shoulder 2b whose inside surface fixes or establishes the membrane position in the radial direction.

The passage apertures 6 render possible an adjustment of the rigidity of the membrane 1 in the radial and axial directions to the respectively existing or arising stress or load values that are produced by the rotor. A further advantage of the passage apertures 6 is produced during the evacuation of air from the bearing housing in case the bearing is intended to be used in vacuum operation.

The supporting body as well as the bending-resistant pin 3 with the fastening screw 4 have been illustrated merely for purposes of providing a better understanding of the invention.

It will be obvious to those skilled in the art that many modifications may be made within the scope of the present invention without departing from the spirit thereof, and the invention includes all such modifications.

What is claimed is:

1. In an elastic centering suspension of supporting bodies for spiral groove bearings,
   the improvement which comprises a circular membrane having apertures therein and secured to a retaining ring by electron beam welding, whereby the membrane is secured to said ring without deformation.

2. A suspension according to claim 1 in which the membrane has apertures uniformly distributed at the circumference thereof.

* * * * *